J. P. FRIZELL.
Method of Raising Water.

No. 233,499. Patented Oct. 19, 1880.

Inventor
Joseph P. Frizell

UNITED STATES PATENT OFFICE.

JOSEPH P. FRIZELL, OF BOSTON, MASSACHUSETTS.

METHOD OF RAISING WATER.

SPECIFICATION forming part of Letters Patent No. 233,499, dated October 19, 1880.

Application filed September 15, 1879.

*To all whom it may concern:*

Be it known that I, JOSEPH P. FRIZELL, of Boston, in the county of Suffolk and State of Massachusetts, have invented a new Method of Raising Water by Means of Compressed Air, of which the following is a full, clear, and exact description, reference being had to the accompanying drawing, making part of this specification, in which—

Figure 1:
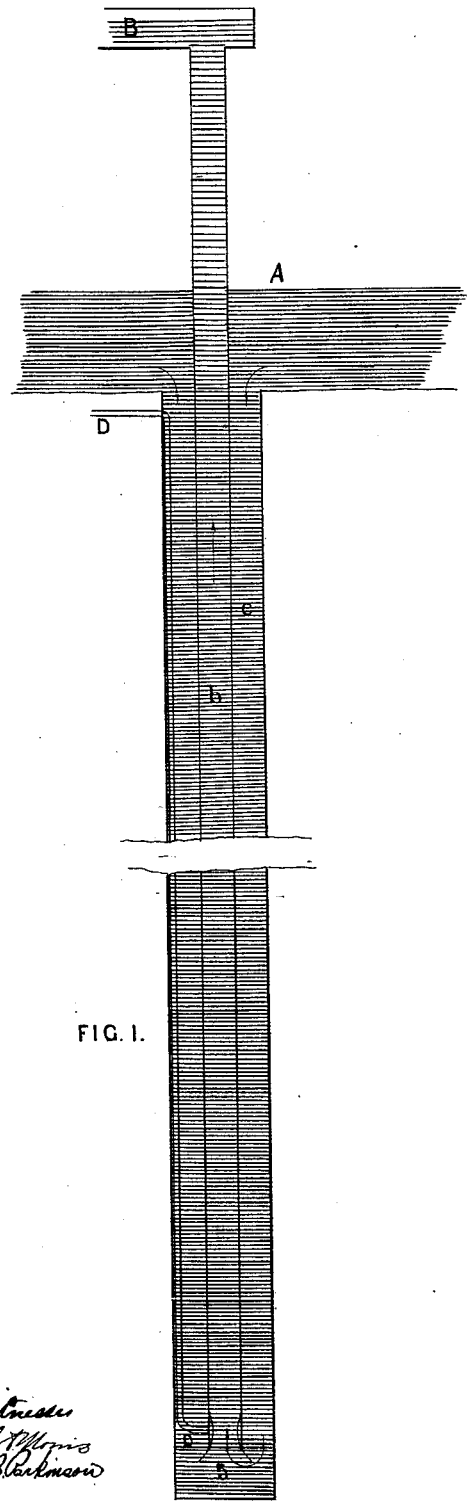
Figure 2:
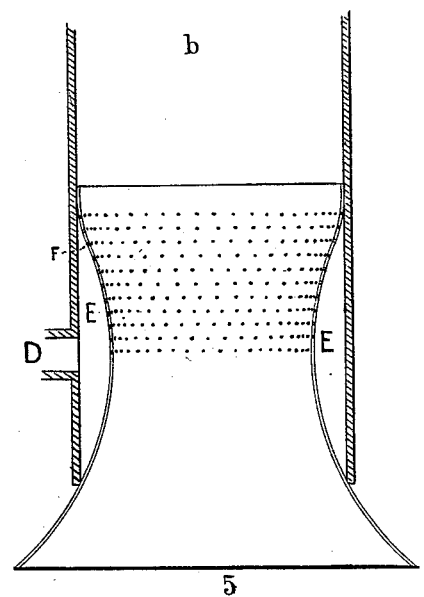

Figure 1 is a vertical section through an apparatus constructed in accordance with my invention for raising water by means of compressed air. Fig. 2 is an enlarged vertical section of the lower end of the rising-pipe On the 29th day of January, 1878, Letters Patent of the United States were granted to me for a method of compressing air by causing it to be introduced into a column of water descending through a shaft or pipe and flowing through a tunnel into and out of an ascending shaft or pipe, the air compressed in the descending-shaft escaping into a suitable reservoir, where it accumulated, and from where it was conducted to any desired point, where it was to be utilized.

My present invention embodies exactly the reverse of this operation, having for its object the elevation of water in a simple and convenient manner by the introduction thereunder of compressed air; and it consists in causing a column of water to ascend in a pipe or conductor by the injection therein, at or near its bottom, of compressed air, the weight of the air and water thus commingled being overcome by the weight of the external water, which is thus utilized as a motive power to elevate the water to the desired point.

To enable others skilled in the art to understand and use my invention, I will proceed to describe the manner in which I have carried it out.

In the said drawing, which represents, in section, my contrivance for elevating water, A denotes the surface of the body of water to be drawn from, and B the reservoir into which it is to be raised. C is a shaft or pit sunk in the earth to a depth corresponding to the pressure of the air used, and communicating with the body of water A. *b* is the rising-pipe extending from near the bottom of the pit up to the reservoir B. The height from the surface A to the surface of B is the lift.

Experiments show that the depth of the pit, reckoned from A, should be as much as five or six times the lift.

Into the bottom of the rising-pipe is fitted the hour-glass-shaped pipe 5, inclosing between the two pipes the annular space E E.

The upper end of the pipe 5 is perforated with a great number of minute orifices, F, as indicated by the black dots. The lower end expands to a greater width than that of the rising-pipe in order to diminish the resistance of the water in entering.

The pipe D, leading from the source of compressed air, opens into the annular space E E. The pit or shaft C and rising-pipe *b* being filled with water to the level of A, compressed air is admitted to the pipe D and passes into the annular space E E, thence through the perforations F into the water in the pipe *b*, through which it rises in the form of minute bubbles.

The pipe D, which conveys the compressed air may pass down in the pit C, as shown, or inside the rising-pipe *b*, or outside the pit C in the ground, if preferred.

The pit or shaft C may, of course, be dispensed with if there is naturally a sufficient depth of water, it being merely necessary to introduce compressed air within the pipe or conductor, through which the water is to be raised at or near its bottom in order that it may rise, expand, and diminish the weight of the column of water therein, as before described.

I am aware of Patent No. 61,571, and lay no claim to the apparatus or method of operation therein shown and described.

What I claim as my invention, and desire to secure by Letters Patent, is—

In the art of elevating water, the method of causing a column of water to ascend in a conductor by the weight of the external water, which consists in introducing a tube of the desired length at the required depth into the water to be elevated, and then injecting compressed air in the form of minute bubbles into the water at the lower end of said tube, thereby aerating the water, whereby a continuous stream is caused to flow upward to the point of discharge, substantially as described.

Witness my hand this 7th day of August, A. D. 1879.

JOSEPH P. FRIZELL.

In presence of—
C. J. A. MORRIS,
J. B. PARKINSON.